(12) United States Patent
Keller

(10) Patent No.: US 8,698,765 B1
(45) Date of Patent: Apr. 15, 2014

(54) ASSOCIATING CONCEPTS WITHIN CONTENT ITEMS

(75) Inventor: Kevin E. Keller, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 594 days.

(21) Appl. No.: 12/857,843

(22) Filed: Aug. 17, 2010

(51) Int. Cl.
*G06F 3/041* (2006.01)

(52) U.S. Cl.
USPC ......... 345/173; 340/407.2; 707/729; 707/730

(58) Field of Classification Search
USPC ............. 707/999.01, E17.065, 705, 729, 730, 707/759, E17.017; 715/234, 255, 256, 259, 715/260, 261; 345/173–178
See application file for complete search history.

(56) References Cited

U.S. PATENT DOCUMENTS

| | | | |
|---|---|---|---|
| 7,493,253 B1 * | 2/2009 | Ceusters et al. | 704/9 |
| 7,856,597 B2 * | 12/2010 | Stuhec | 715/255 |
| 8,135,692 B2 * | 3/2012 | Hattori et al. | 707/705 |
| 2007/0219986 A1 * | 9/2007 | Egozi | 707/5 |
| 2007/0233692 A1 * | 10/2007 | Lisa et al. | 707/10 |
| 2008/0294674 A1 * | 11/2008 | Reztlaff et al. | 707/102 |
| 2009/0172514 A1 * | 7/2009 | Radovanovic | 715/212 |
| 2011/0055238 A1 * | 3/2011 | Slaney et al. | 707/759 |

* cited by examiner

*Primary Examiner* — Abbas Abdulselam
*Assistant Examiner* — Gerald Oliver
(74) *Attorney, Agent, or Firm* — Lee & Hayes, PLLC

(57) ABSTRACT

Techniques for associating concepts found within content items rendered by electronic devices. By associating concepts in this manner, a user of an electronic device is able to view how these concepts interrelate with one another across various content items stored on or accessible by the electronic device. For instance, a user may associate a first concept with a second concept in an index of the electronic device. Thereafter, the user may conduct a search for the first concept and, in response, the electronic device may reference the index and determine that this first concept is in fact associated with the second concept. As such, the electronic device may return results that include both the first and second concepts, possibly within a certain specified distance of one another within a content item. The user is therefore able to see how the first concept and the second concept interrelate with one another.

31 Claims, 16 Drawing Sheets

ASSOCIATING CONCEPTS WITHIN CONTENT ITEMS

BACKGROUND

A large and growing population of users is enjoying entertainment through the consumption of digital content items (or simply "content items"), such as music, movies, images, electronic books, and so on. The users employ various electronic devices to consume such content items. Among these electronic devices are electronic book (eBook) reader devices, cellular telephones, personal digital assistants (PDAs), portable media players, tablet computers, netbooks, and the like. While consuming content items on these devices, users often desire to research interesting concepts within these items. For instance, users often conduct web searches and visit popular informational websites for the purpose of learning more information about a particular concept.

As the quantity of available electronic media content continues to grow, along with increasing proliferation of devices to consume that media content, finding ways to enhance user experience continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
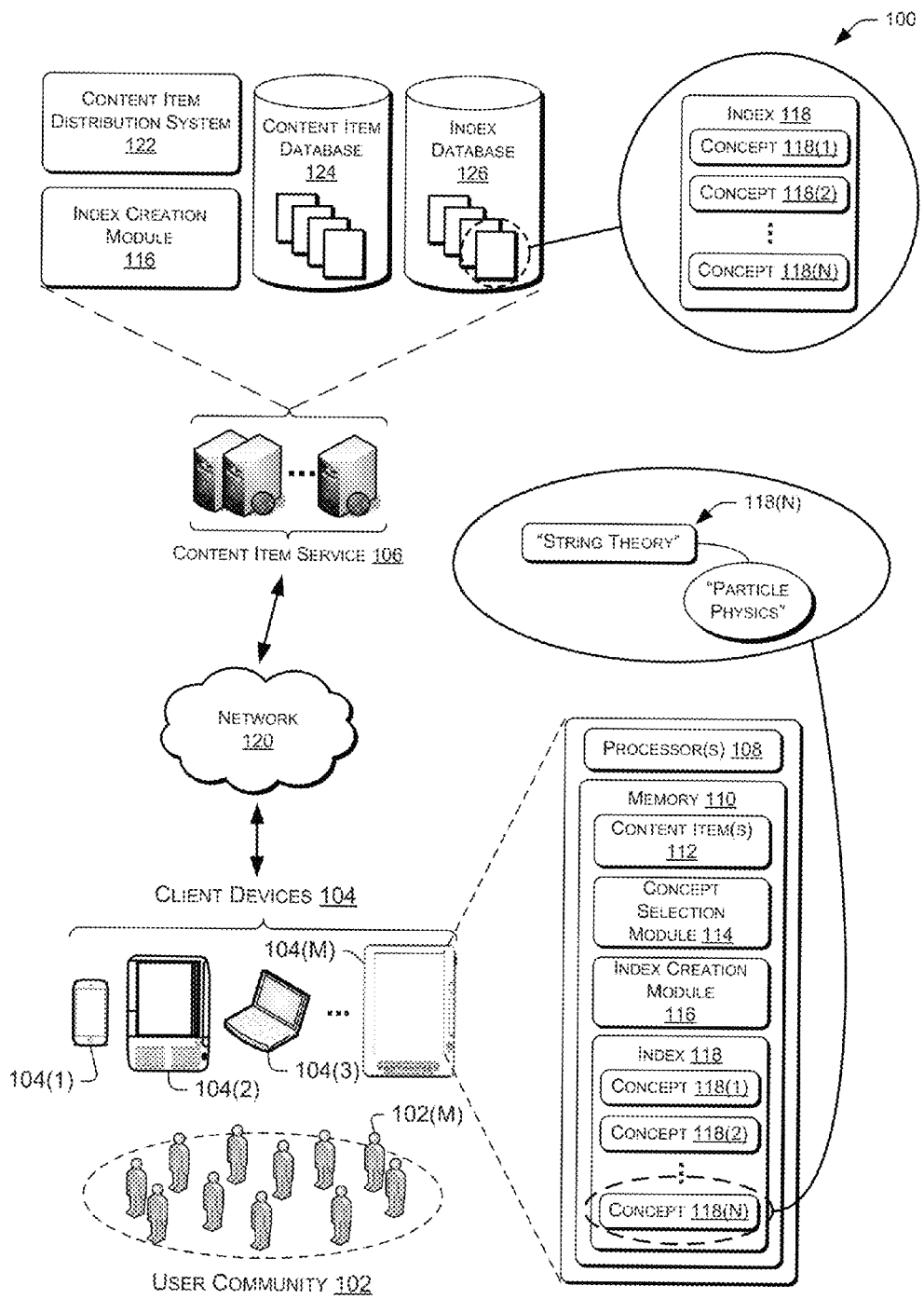
FIG. 1 illustrates an architecture in which users of a user community are able to operate respective client devices to consume content items, such electronic books and the like. These users are also able to implement the techniques described below to associate concepts with one another in indices accessible by the respective devices (such as "String Theory" and "Particle Physics").

This disclosure describes techniques for associating concepts found within content items rendered by electronic devices. By associating concepts in this manner, a user of an electronic device is able to view how these concepts interrelate with one another across various different content items stored on or accessible by the electronic device. For instance, a user may associate a first concept with a second concept in an index of the electronic device. Thereafter, the user may conduct a search for the first concept and, in response, the electronic device may reference the index and determine that this first concept is in fact associated with the second concept. As such, the electronic device may return results that include both the first and second concepts, possibly within a certain specified distance of one another within a content item. The user is therefore able to see how the first concept and the second concept interrelate with one another. While this example describes associating or linking two concepts with one another within the index, the user may associate or link any other number of concepts within the index.

In one example, a user operates an electronic book (eBook) reader device, a tablet computing device, or the like, which may implement a touch-sensitive display (or "touchscreen"). The eBook reader device, for example, may store or otherwise have access to multiple different eBooks, which may comprise novels, magazines, newspapers, or like, as described in detail below. While reading an eBook, the user may select (e.g., via the touch-sensitive display) a certain concept within the eBook. For instance, the user may select one or more words, an image, a portion of a map, or any other piece of content that visually represents a concept.

In response to this selection, the eBook reader may access a local or remote index associated with the device to determine if this concept has previously been associated, by the user or otherwise, with any other concepts within the index. If, in this example, the selected concept is free from this sort of previous association, then the eBook reader device may surface information associated with the selected concept. This information may comprise, for instance, a reference work entry for this concept (e.g., a dictionary entry, an encyclopedia entry, a thesaurus entry, etc.), other instances of this concept within the currently rendered eBook, other instances of this concept within other eBooks stored on or accessible by the eBook reader device, web results associated with the selected concept, or any other type of information associated with the concept.

In some instances, the device surfaces this information over the currently rendered eBook, such as in the form of a pop-up menu. The user may thereafter select to view more information regarding one of the items listed in the menu. For instance, if the menu includes other instances of the selected concept across other eBooks stored on or accessible by the eBook reader device, then the user may select one of the instances. In response, the eBook reader device may overlay a passage from the eBook associated with the selected instance that includes the selected concept. While reading this passage, the user may choose to associate a second concept with the first, originally selected concept. To do so, the user may, for instance, select the second concept within the passage via the touch-sensitive display. In response, the eBook reader device may prompt the user as to whether the user would like to associate with the first and second concepts with one another. The user may choose to affirmatively associate these concepts, in which case the eBook reader device may link the first concept with the second concept, and vice versa, within an index of concepts stored on or accessible by the eBook reader device. In addition, the device may surface information associated with both of these concepts in response to the selection.

In some instances, this index is custom to the individual device and/or to a user associated with the device. Therefore, the user is able to associate different concepts with one another within the index using the techniques described above for the purpose of tailoring the index to the individual user.

After the device links the first and second concepts with one another within the index, the user may, at a later time, be reading the same or another eBook on the eBook reader device. While doing so, the user may again select (e.g., via the touch-sensitive display or otherwise) the first or the second concept. In response, the device may access the index and determine that the selected concept is associated with another concept (i.e., the non-selected one of the first and the second concept). The device may then prompt the user to select whether to surface information associated with the selected concept or the associated concept alone, or whether to surface information associated with both the selected concept and the associated concept. If the latter, the device may also prompt the user to select how close in proximity to one another these concepts should reside in order to be included within the search results. The user may, for instance, select to search for passages of eBooks in which both the first and second concepts appear within the same paragraph or other proximity. The device may therefore return passages of the currently rendered eBook and/or other eBooks that include both concepts within the same paragraph. The user may thereafter navigate into these different passages to learn more about the interrelation of the first and second concepts. In some instances, the eBook reader device may utilize a previously set default preference of the user to display the passages of the currently rendered eBook and/or other eBooks that include both concepts, without prompting the user after the selection of the concept.

The discussion begins with a section entitled "Example Architectural Environment" that describes one environment that may implement the described techniques. The discussion then proceeds to a section entitled "Example User Interfaces" that describes example interfaces that an example electronic device may render to allow a user to associate concepts found within content items with one another. Next, a section entitled "Example Electronic Device" illustrates and describes one instance of a device that may be equipped to implement the techniques described herein. Finally, a section entitled "Example Processes" and a brief conclusion ends the discussion.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Example Architectural Environment

FIG. 1 illustrates an example architecture 100 in which a community of users 102 operates respective client devices 104(1), 104(2), 104(3), . . . , 104(M) to consume content items, such electronic books (eBooks), songs, videos, still images and the like. In this architecture, the client devices 104 and/or a content item service 106 implement techniques to associate concepts found within content items with one another in indices associated with respective client devices 104.

The client devices 104 are variously configured with different functionality to enable consumption of one or more types of contents items of any type or format including, for example, electronic texts (e.g., documents of any format, electronic periodicals, such as digital magazines and newspapers, etc.), digital audio (e.g., music, audible books, etc.), digital video (e.g., movies, television, short clips, etc.), images (e.g., art, photographs, etc.), and multi-media content. The terms "electronic book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, etc.

FIG. 1 illustrates that the client devices 104 operated by users of the user community 102 may comprise multifunction communication devices (e.g., device 104(1), eBook reader devices (e.g., devices 104(2) and 104(M)), laptop computers (e.g., device 104(3)), portable digital assistants (PDAs), wireless headsets, entertainment systems, portable media players, tablet computers, cameras, video cameras, netbooks, notebooks, desktop computers, gaming consoles, DVD players, media centers, or any other type of device.

As illustrated, a user 102(M) may operate the example eBook reader device 104(M), which may include one or more processors 108 and memory 110. Each of the other client devices 104 may be similarly equipped. In this example, the memory 110 stores, in part, one or more content items 112, a concept selection module 114, an index creation module 116, and an index 118. The concept selection module 114 allows the user 102(M) to select a concept found within a rendered one of the content items 112 and, in response, this module outputs information associated with the selected concept. For instance, the module 114 may output a reference work entry associated with the selected concept, other instances of the selected concept within the currently rendered content item and/or other ones of the content items 112, or any other information associated with the selected concept.

The index creation module 116, meanwhile, allows the user 102(M) to link one or concepts 118(1), 118(2), . . . , 118(N) of the index 118 with one another and, hence, create an index that is custom to the device 104(M) and/or the user 102(M). For instance, after the concept selection module 114 surfaces information associated with a selected concept, the user 102(M) may navigate this information and identify another concept of interest. Further, the user 102(M) may select this concept and, in response, the index creation module 116 may associate the two selected concepts with one another.

While the above passage provides one example, the index creation module 116 may link concepts in a variety of other ways. For instance, the user 102(M) may select two concepts illustrated in a same passage of eBook and provide a command to link these passages within the index 118 of the device 104(M). This command may include operating a particular button on a keypad of the device, stating an oral command, executing a predefined gesture, or any other type of command. In one example, the device 104(M) includes a touch sensor capable of detecting multiple coincident touches. Here, the user 102(M) may link two concepts by selecting two concepts via two respective coincident touches on the touch-sensitive display.

FIG. 1 illustrates, for instance, that the concept 118(N) ("String Theory") has been associated with another concept within the index. Specifically, FIG. 1 illustrates that the concept "String Theory" has been associated with the concept "Particle Physics." As such, when the user 102(M) operates the eBook reader device 104(M) to search one or more of the content items for either "String Theory" or "Particle Physics," the device 104(M) may reference the index 118 and recognize the association between these concepts. With this information, the device 104(M) may return search results that include both concepts or may query the user as to whether the user would like to view results that include the selected concept, the selected concept or the associated concept, or both the selected concept and the associated concept. To make this determination, the device 104(M) may prompt the user to decide or may operate on previously set default behavior.

While FIG. 1 illustrates that the device 104(M) may store the index creation module 116 and the index 118, in other instances the content item service 106 may additionally or alternatively store these components. As illustrated, the content item service 106 is embodied as one or more servers that collectively have processing and storage capabilities to receive requests for content items from the devices, such as the eBook reader device 104(M). The servers of the content item service 106 may be embodied in any number of ways, including as a single server, a cluster of servers, a server farm or data center, and so forth, although other server architectures (e.g., mainframe) may also be used. Alternatively, the content item service 106 may be embodied as a client device, such as desktop computer, a laptop computer, an eBook reader device and so forth. In some implementations, for instance, some or all of the elements of content item service 106 illustrated in FIG. 1 may reside on the client devices 104, and vice versa.

In the architecture 100, the client devices may receive, over a network 120 and from the content item service 106, one or more content items for presentation and storage on the devices. For instance, the eBook reader device 104(M) may have received one or more of the content items 112 stored on the device from the content item service 106. In some instances, the content item service 106 stores the content items 112 in an account associated with the device 104(M) and/or the user 102(M).

The network 120 is representative of any one or combination of multiple different types of networks, such as the Internet, cable networks, cellular networks, wireless networks, and wired networks. One example of a wireless technology and associated protocols is the Wireless Fidelity (WiFi) wireless networking technologies defined according to IEEE 802.11 standards, while another example is a cellular network.

In the illustrated example, the content item service 106 includes a content item distribution system 122, the index creation module 116, a content item database 124 to store the available content items, and an index database 126 to store one or more indices associated with respective client devices 104, such as the index 118 associated with the eBook reader device 104(M). The content item distribution system 122 may support distribution of content items (e.g., online retailing via a website) to the client devices 104. In some implementations, the servers store the content items in the content item database 122, although in other implementations, the servers merely facilitate purchase and delivery of content items stored in other locations.

In instances where the index creation module 116 and the index 118 resides on the content item service 106, the user 102(M) may send requests to associate concepts within the index to the content item service. For instance, the user 102 (M) may select a first concept (e.g., "String Theory") found within one of the content items 112 and may thereafter request to associate this concept with another concept found within the same content item or a different one of the content items 112. In response to receiving the request over the network 120, the index creation module 116 may associate these two concepts with one another within the index 118 associated with the eBook reader device 104(M) and/or the user 102(M). The content item service 106, therefore, may store multiple different indices, each of which is customized to a particular client device and/or to a particular user. Again, each client device may additionally or alternatively store its respective index(es).

In some instances, users of the user community 102 may choose to make his or her index available to other users within the user community 102. By doing so, other users may request (e.g., from the content item service 106) indices from different respective users. For instance, a user of the community 102 may request to receive the index 118 associated with the user 102(M). By doing so, the device of this receiving user would store an index that links the concept "String Theory" with the concept "Particle Physics." Therefore, when this user conducts a search for "String Theory" or "Particle Physics," the device of the user may return results that include reference to both of these concepts, possibly within a certain proximity to one another within an item. By making available these indices, users are able to see how other users associate concepts with one another. For example, users of the user community 102 may choose to see how a well-known author or other individual associates concepts with one another, by requesting and receiving the index of the author or other individual. The requesting user may or may not provide payment for indices of the other users.

Example User Interfaces

FIGS. 2-13 illustrate example user interfaces that the eBook reader device 104(M) (and the other client devices 104 of the architecture 100) may render in accordance with the techniques described above. While these figures illustrate a few example interfaces it is to be appreciated that numerous other types of interfaces may be implemented using the described techniques.

Figure 2:
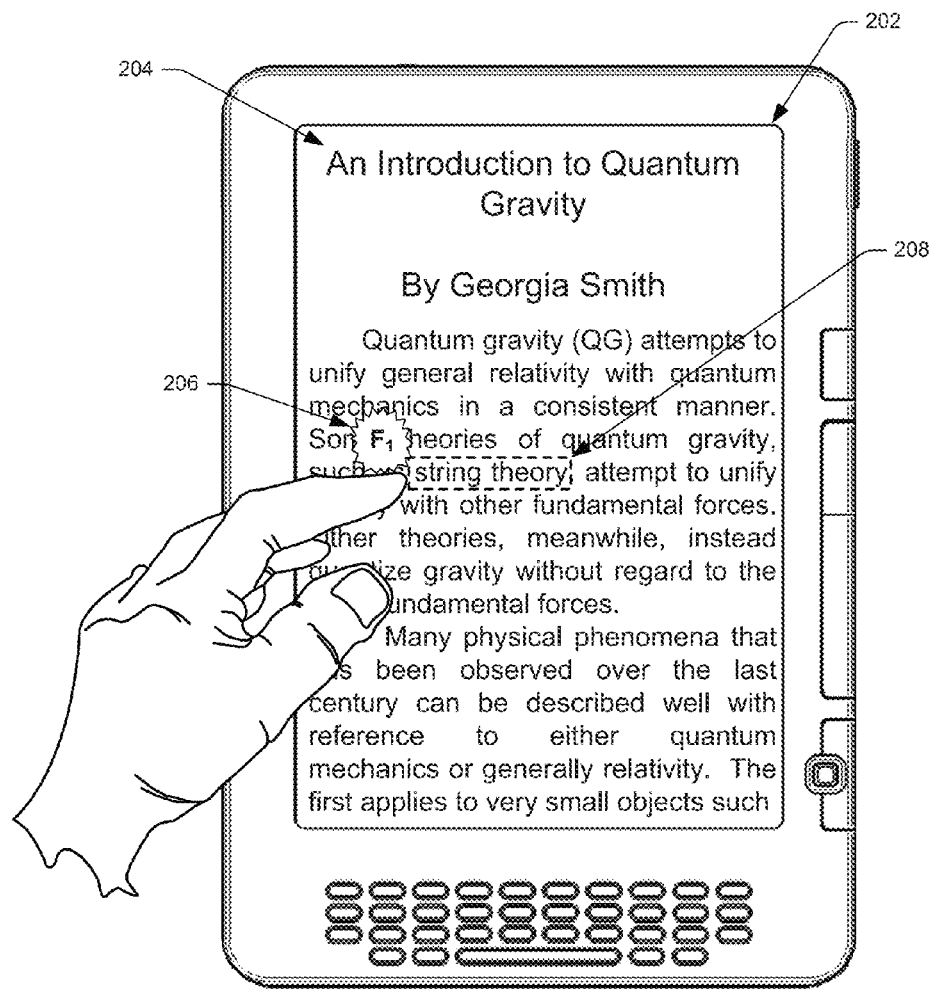
FIG. 2 illustrates an example user interface rendered by a client device of FIG. 1. In this example, the user selects a concept "String Theory" via a touch input on a touch-sensitive display of the device.

FIG. 2, for instance, illustrates an example user interface rendered by a touch-sensitive display 202 of the example eBook reader device 104(1) of FIG. 1. In this example, the user 102(M) is reading an eBook 204 entitled "An Introduction to Quantum Gravity" by Georgia Smith. As illustrated, the user 102(M) selects a concept "String Theory" within the eBook via a touch input 206 on a touch-sensitive display of the device, as an example highlight 208 indicates. For instance, the user 102(M) may select the words "string theory" by touching the display 202 at a beginning location of the words and dragging his or her finger across the end of the words. While the user 102(M) selects the concept via the touch input 206 in this example, the user may select the concept in any other manner in other instances, such as a via a mouse, a keyboard, or the like.

Figure 3:
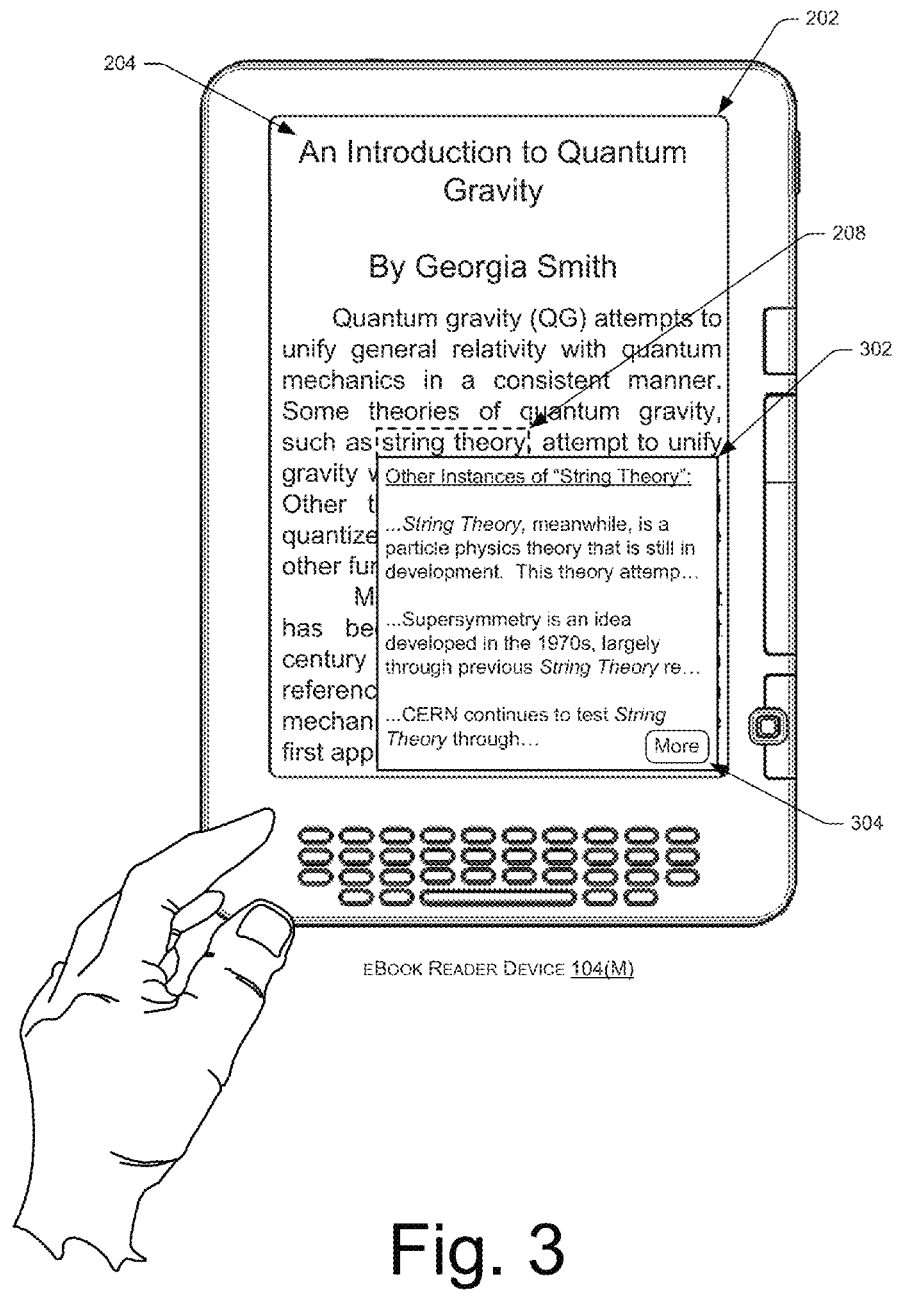
FIG. 3 illustrates an example user interface rendered by the client device after the user selects the concept as shown in FIG. 2. In response, the device outputs information about the selected concept (e.g., other portions in the illustrated content item or other content items that include instances of the selected concept).

FIG. 3 illustrates an example user interface rendered by the eBook reader device 104(M) after the user 102(M) makes the selection shown in FIG. 2. In response to this selection, the device 104(M) has output information 302 about the selected concept "String Theory." Here, the information comprises other instances of the concept "String Theory" within the illustrated eBook 204 and/or within other content items stored on or accessible by the device. In other implementations, the information 302 may comprise web results associated with a query "string theory," a reference work entry for the concept "string theory," or any other information associated with this concept. Further, in some instances where the device includes a touch sensor that is capable of detecting varying amounts of force, the information 302 that the device outputs may depend upon the measured amount of force of the touch input 206.

As illustrated, the information 302 comprises other instances of the concept "String Theory," with each instance surrounded by a passage of an eBook in which this concept resides. Each of these listed passages may be selectable, such that selection of a particular illustrated passage results in display of a larger portion of that passage (e.g., display of the corresponding eBook at that location). In some instances, the device 104(M) displays this information over the currently rendered eBook 204. In addition, the menu that includes the information 302 includes an icon 304 ("More") that, when selected, causes the device 104(M) to display additional instances of the selected concept "String Theory."

In some instances, the surfaced information is based at least in part upon a measured amount of force of the touch input 206. For instance, a first amount of pressure may cause display of instances of the selected concept within the currently rendered content item, a second, greater amount of force may cause display of instances of the selected concept within other content items stored on or accessible by the device, and a third, even greater amount of force may cause display of web results associated with a query comprising the selected concept. Of course, other implementations may cause display of information associated with the selected concept in any other manner.

Figure 4:
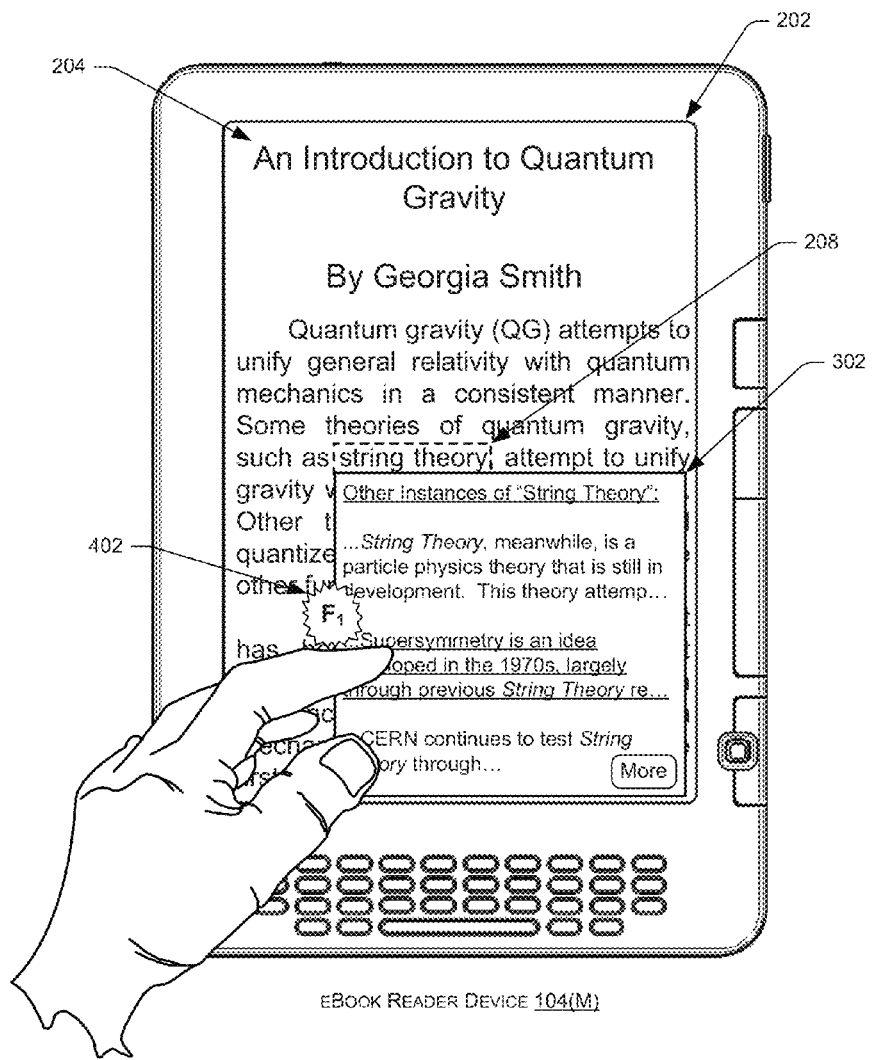
FIG. 4 illustrates an example user interface rendered by the client device when the user selects one of the other portions that includes an instance of the selected concept "String Theory."

FIG. 4 illustrates an example user interface rendered by the eBook reader device 104(M) when the user 102(M) selects one of the other passages that includes an instance of the selected concept "String Theory" from the information 302 of FIG. 3. As illustrated, the user 102(M) selects this passage via a touch input 402. Again, the user may make this selection in any other manner in other implementations.

Figure 5:
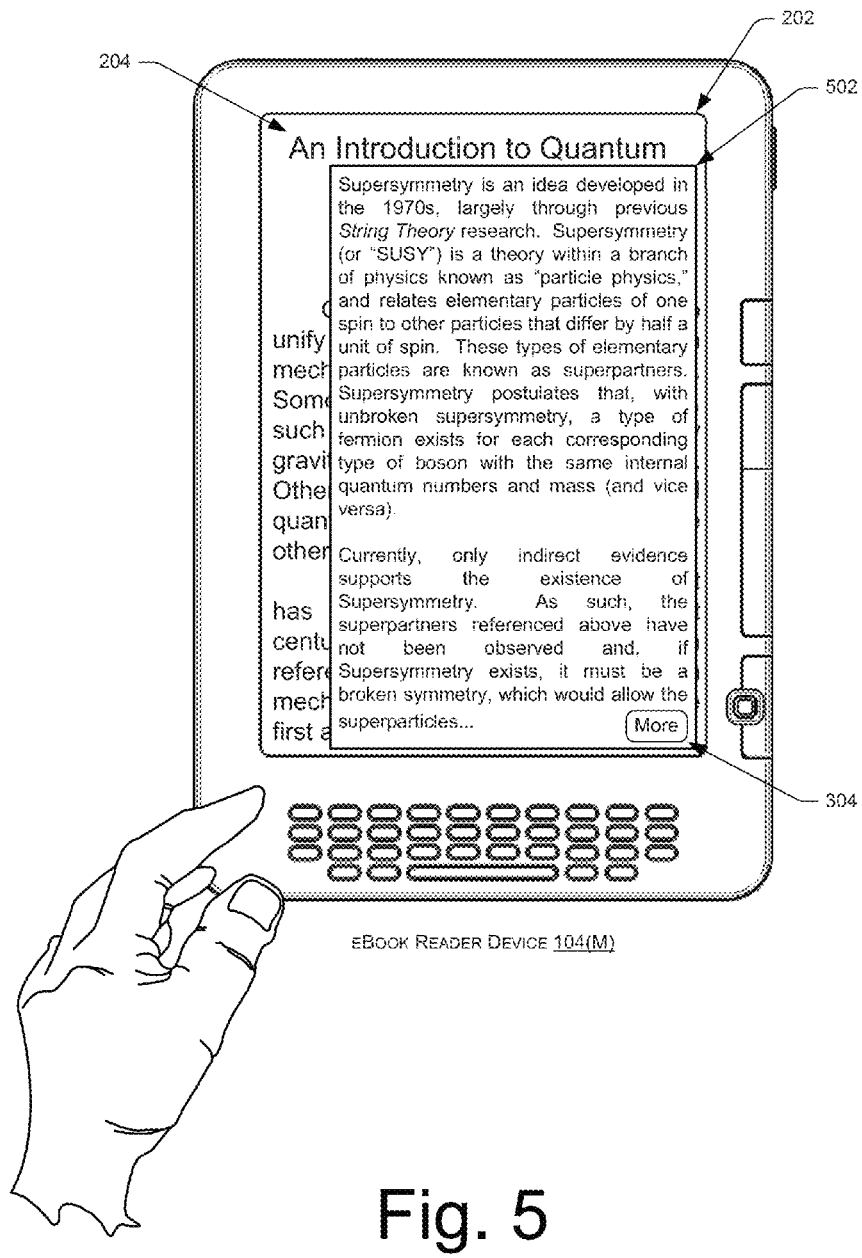
FIG. 5 illustrates an example user interface rendered by the client device after the selection made in FIG. 4. As illustrated, the device has expanded the selected portion.

FIG. 5 illustrates an example user interface rendered by the eBook reader device 104(M) after the user 102(M) makes the selection shown in FIG. 4. As illustrated, the device has displayed an expanded portion 502 of the selected passage in response to the selection. At this point, the user is able to read a larger section of the passage that includes the concept "String Theory" that originally interested the user 102(M).

Figure 6:
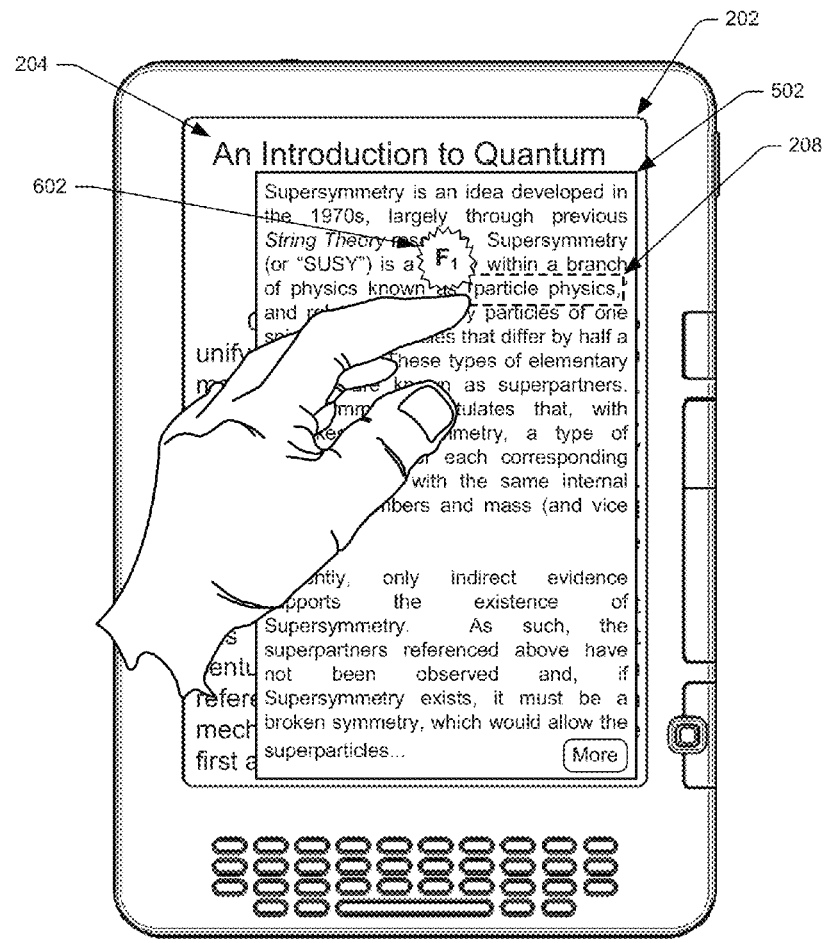
FIG. 6 illustrates an example user interface rendered by the client device when the user selects a second concept, with this concept residing in the expanded portion shown in FIG. 5.

FIG. 6 illustrates an example user interface rendered by the eBook reader device 104(M) when the user 102(M) selects a second concept, with this concept residing in the text of the expanded portion 502 of the passage shown in FIG. 5. As illustrated, in this example the user has selected the concept "Particle Physics" via a touch input 602, as the highlight 208 indicates.

Figure 7:
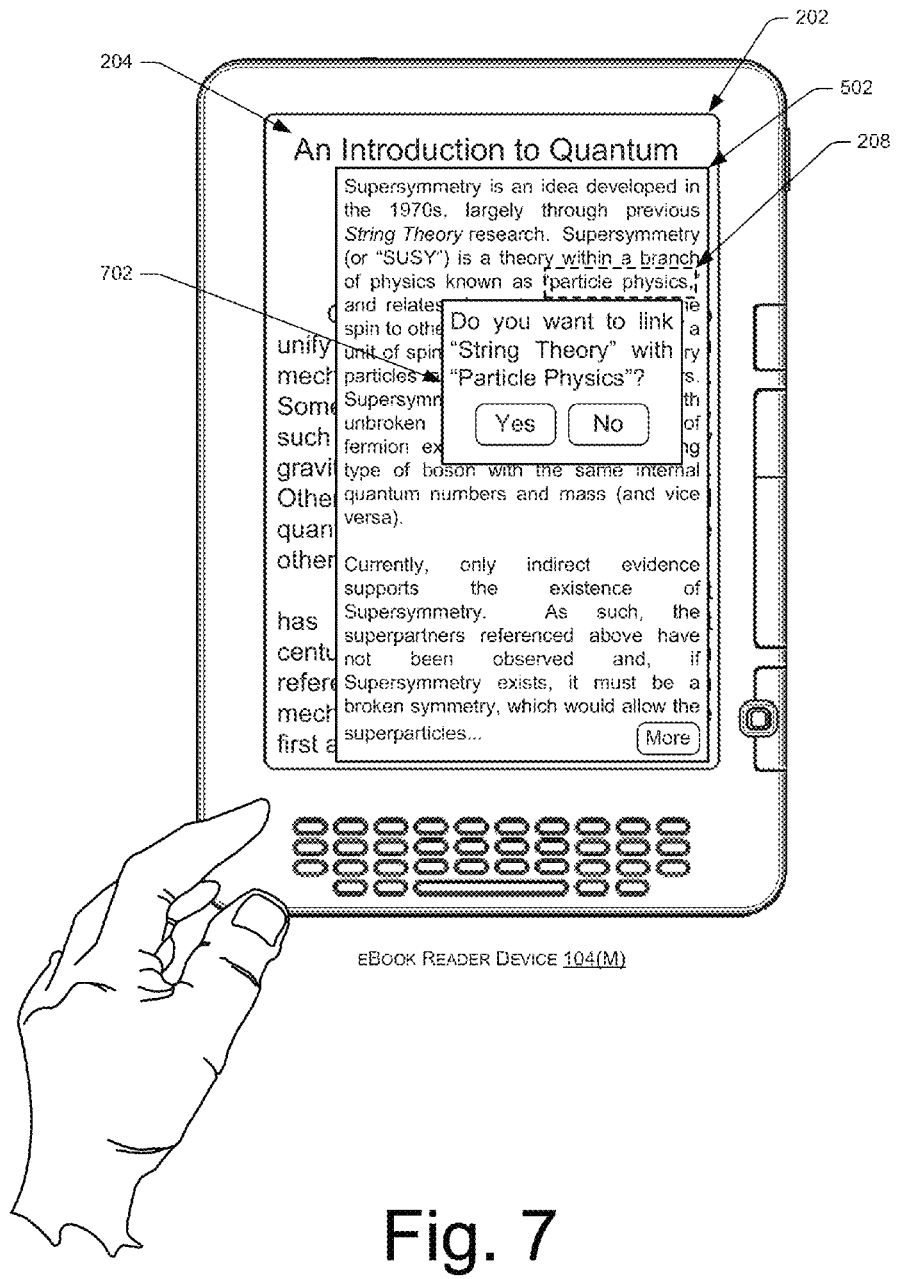
FIG. 7 illustrates an example user interface rendered by the client device after the user has selected the second concept. As illustrated, the device asks the user whether the user would like to associate the first selected concept ("String Theory") with the second selected concept ("Particle Physics"), such as within the index of FIG. 1.

FIG. 7 illustrates an example user interface rendered by the eBook reader device 104 (M) after the selection shown in FIG. 6. As illustrated, in response to this selection the device 104(M) displays a query 702 that asks the user 102(M) whether the user would like to associate the first selected concept ("String Theory") with the second selected concept ("Particle Physics"), such as within the index 118 associated with the device and/or the user.

In some instances, the device 104(M) provides this query 702 when a force of the touch input 602 is greater than a minimum threshold force or when a time of the touch input 602 is greater than a minimum threshold time. In these instances, the user is able to signal to the device the desire to link the concepts by the amount of pressure provided by the touch input. In these instances, the device may refrain from surfacing the query 702, and may instead simply associate the concepts within the index 118.

In other instances where the device 104(M) includes a touch sensor that is capable of detecting multiple coincident touches, the user 102(M) may signal the desire to link concepts with one another by touching both the first and second concepts in the same time. Again, the device may or may not refrain from surfacing the query 702 in these instances. Still other gestures are envisioned and may be used for the purpose of associating concepts within the index 118 of the device 104(M).

Figure 8:
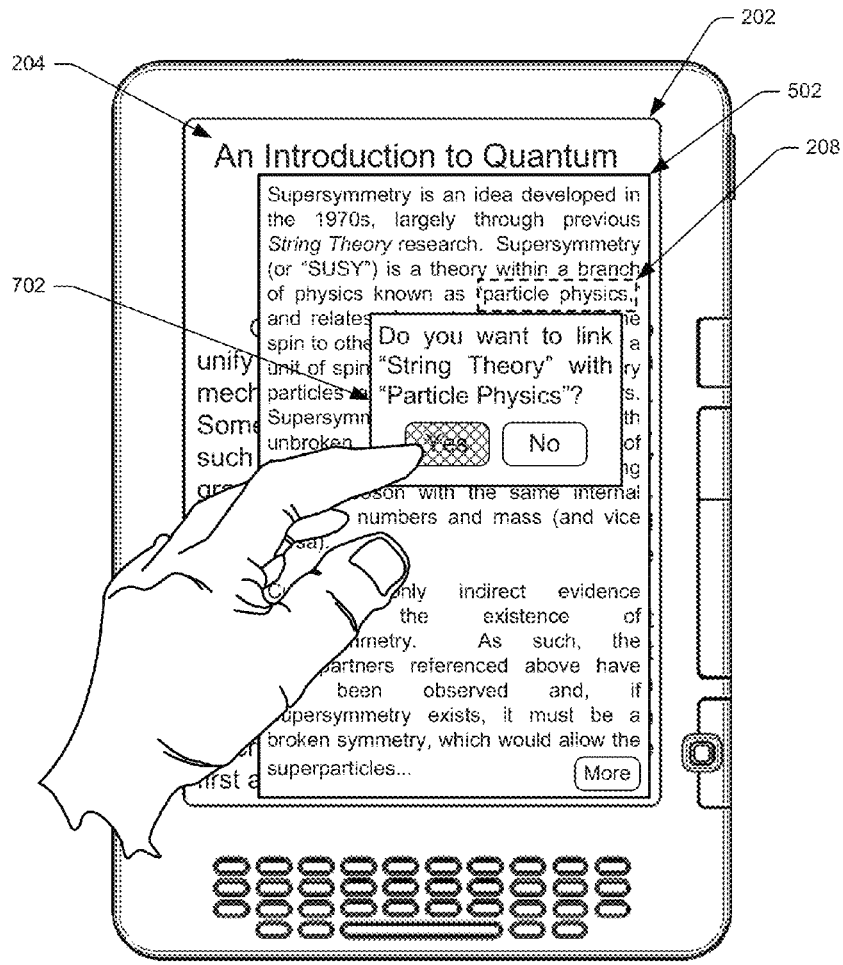
FIG. 8 illustrates an example user interface rendered by the client device when the user selects to associate the first and second concepts with one another.

FIG. 8 illustrates an example user interface rendered by the eBook reader device 104(M) when the user selects to associate the first and second concepts with one another. As illustrated, the user 102(M) here selects the "yes" icon that, when selected, associates "Particle Physics" with "String Theory," and vice versa, within the index 118. At this point, when the user 102(M) conducts a search of either of these concepts, the device 104(M) may include results that are associated with both concepts, thus allowing the user to learn about the interrelation between "Particle Physics" and "String Theory" as discussed in detail below.

Figure 9:
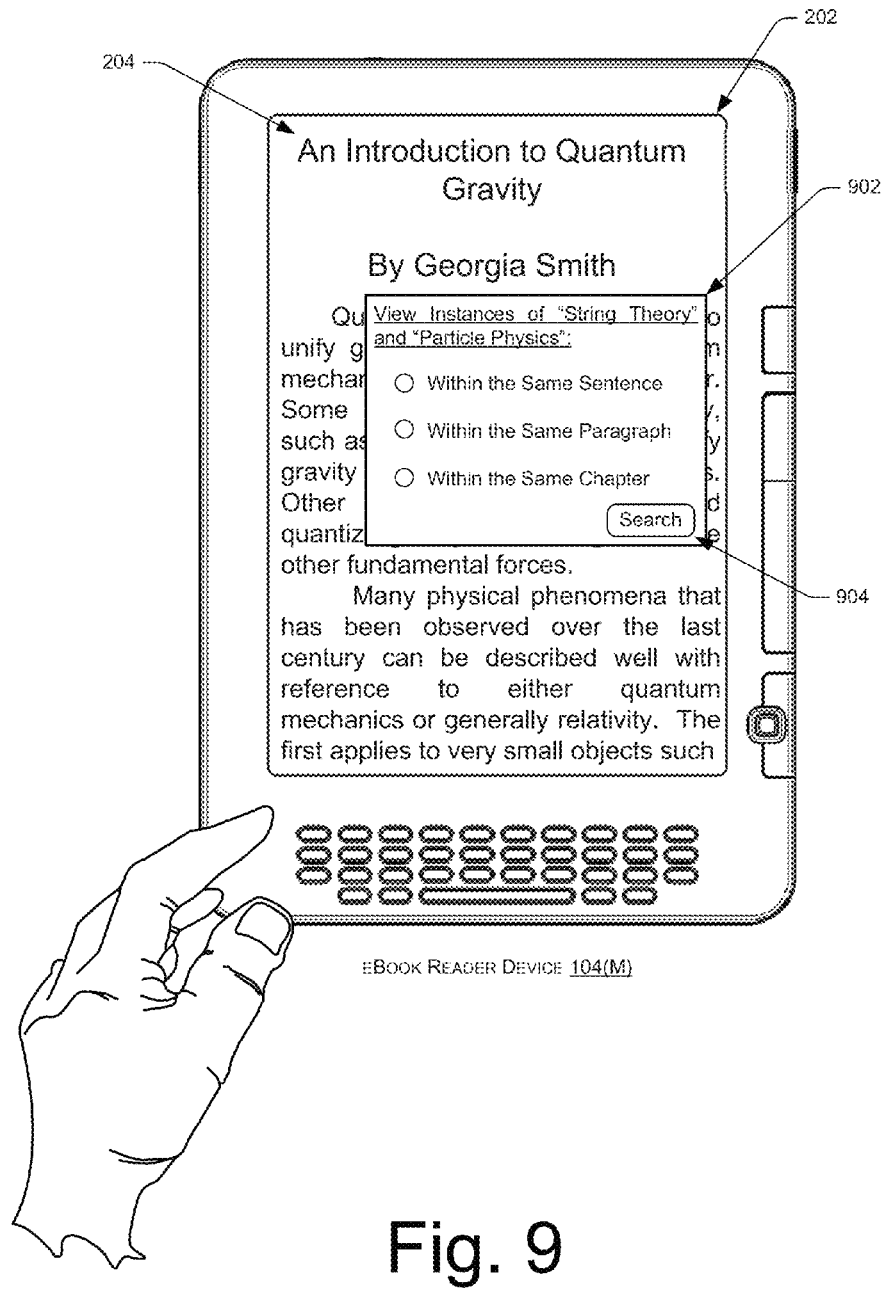
FIG. 9 illustrates an example user interface rendered by the client device after the user has selected to associate the first and second concepts with one another, as shown in FIG. 8. As illustrated, the device asks the user whether the user would like to view portions of the illustrated content item or other content items that include instances of both the first and second concepts within a predefined distance from one another.

FIG. 9 illustrates an example user interface rendered by the eBook reader device 104(M) after the user has selected to associate the first and second concepts with one another, as shown in FIG. 8. As illustrated, the device displays a query 902 that asks the user whether the user would like to view passage of the illustrated eBook 204 or other eBooks that include instances of both the first and second concepts within a predefined distance from one another. Here, the query 902 asks whether the user would like to view passages that include instances of "String Theory" and "Particle Physics" within the same sentence, paragraph, or chapter. In other instances, the query 902 may allow the user to select any other proximity. Further, the device 104(M) may refrain from prompting the user and may instead surface passages that include these concepts within a predefined proximity.

Figure 10:
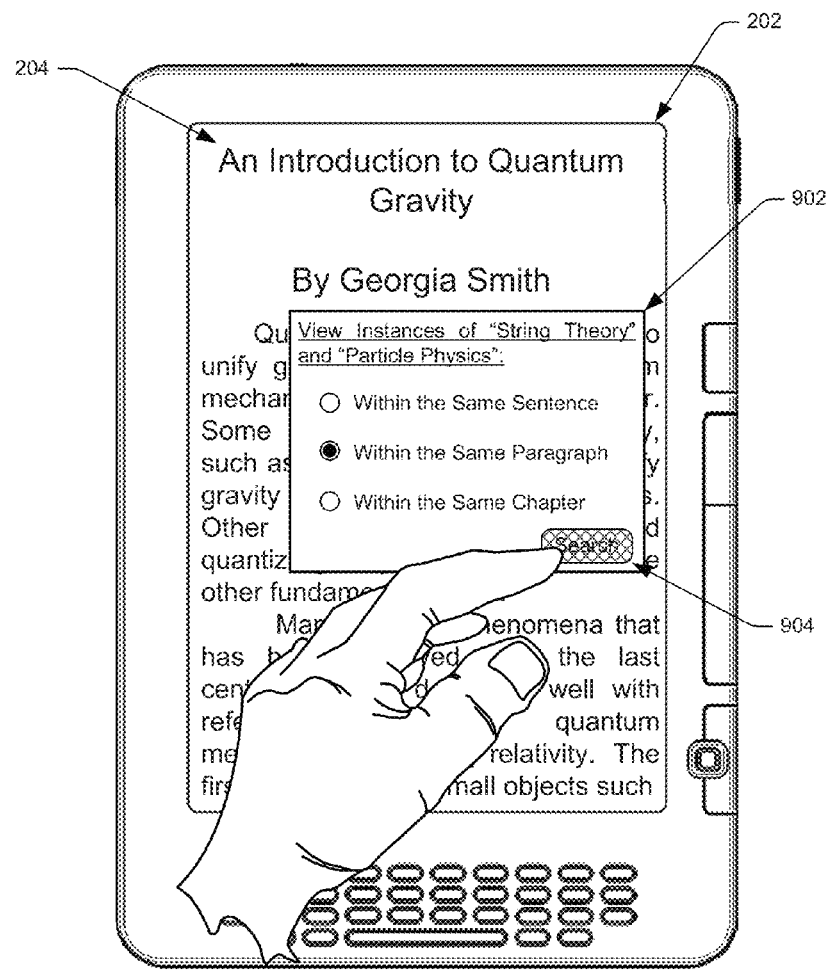
FIG. 10 illustrates an example user interface rendered by the client device when the user selects to view portions of the illustrated content item that include instances of the first and second concepts within the same paragraph.

FIG. 10 illustrates an example user interface rendered by the eBook reader device 104(M) when the user 102(M) selects to view passages of the illustrated eBook 204 (and/or other eBooks) that includes instances of the first and second concepts within the same paragraph.

Figure 11:
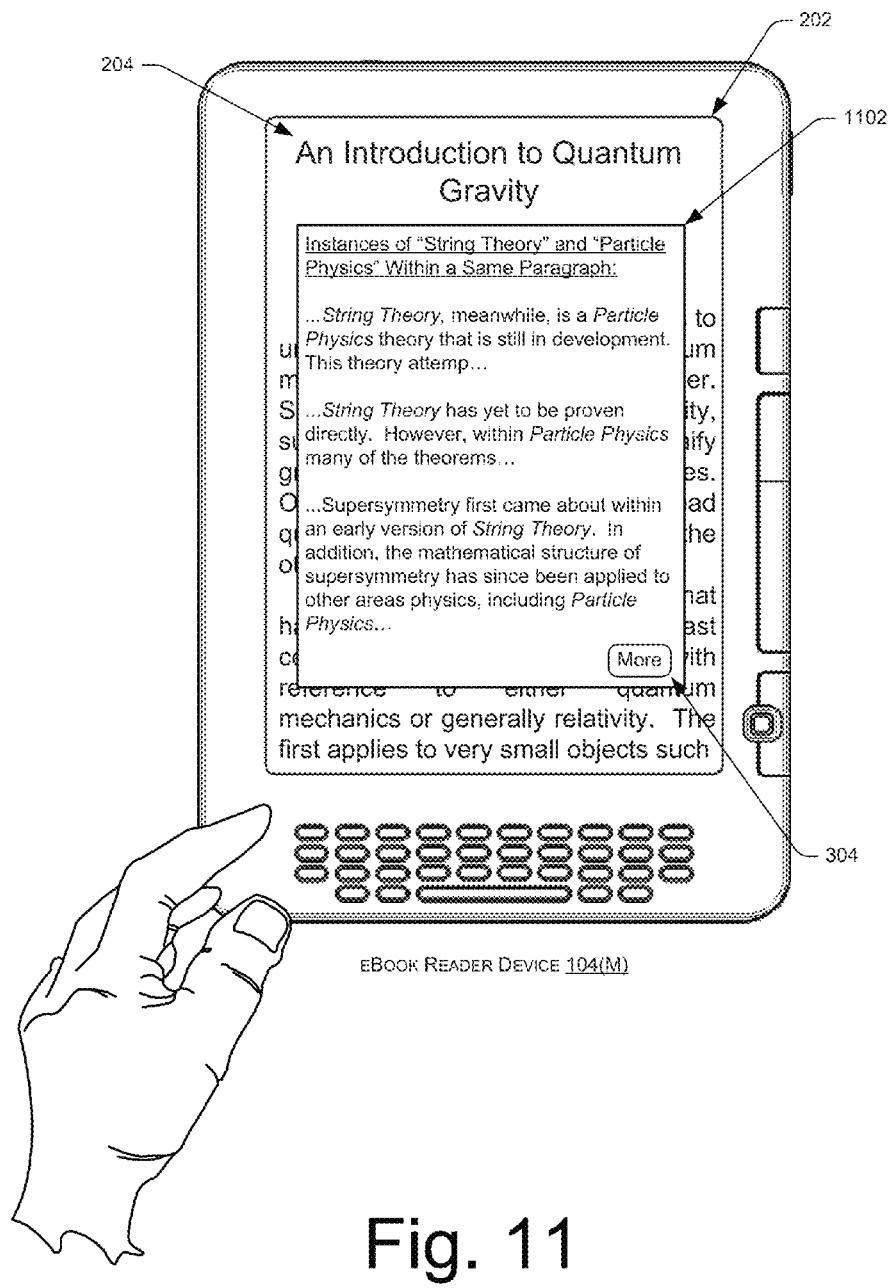
FIG. 11 illustrates an example user interface rendered by the client device after the user has made the selection of FIG. 10.

FIG. 11, meanwhile, illustrates an example user interface rendered by the eBook reader device 104(M) after the user has made the selection of FIG. 10. In response to this selection, the device 104(M) displays a menu 1102 comprising passages that include "String Theory" and "Particle Physics" within the same paragraph. Like the information 302 of FIG. 3, each of the passages may be selectable to allow the user to view a larger portion of the passage and/or to begin reading the corresponding eBook at the location of the passage.

Viewing the example interfaces of FIGS. 2-11 as a whole, this series of interfaces has allowed the user 102(M) to select a particular concept of interest (e.g., "String Theory"), view additional information about this concept, select a second concept (e.g., "Particle Physics") within this additional information, link the second concept to the original concept within an index, and view passages that include both concepts. These passages may reside within the originally illustrated eBook 204 and/or within other eBooks stored on or accessible by the eBook reader device 104(M). For instance, the passages may reside in eBooks that the user 102(M) of the device 104(M) has previously purchased. In other examples, some or all of the passages reside in eBooks that the user 102(M) has not purchased. In these latter instances, the user 102(M) may be able to view the sample passages for free, before deciding whether or not to purchase the entire eBook associated with the passage, based on the user's interest in the sample passage.

In each of these instances, the user 102(M) has been able to link two concepts with one another and read or otherwise learn about the interconnection between these two concepts. Further, the user 102(M) may leverage this index 118 that includes the linked concepts after the linking of these concepts, as discussed immediately below.

Figure 12:
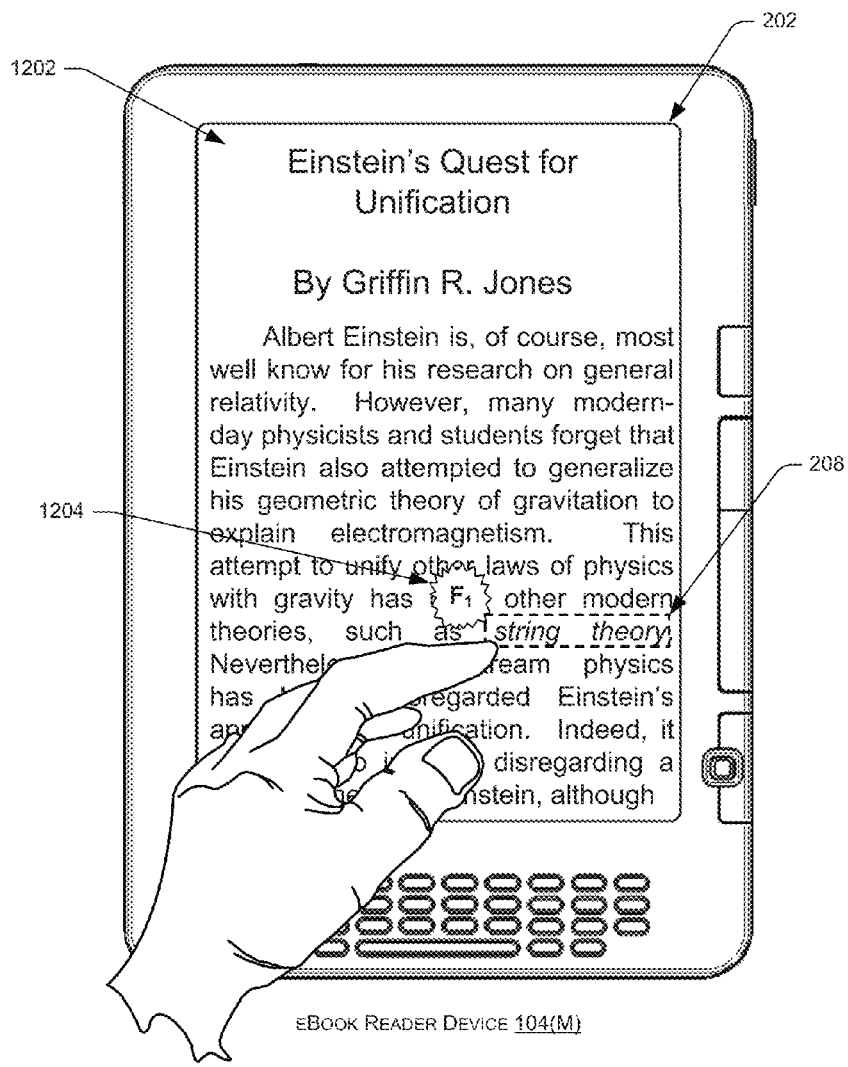
FIG. 12 illustrates an example user interface rendered by the client device when the user again selects the first concept ("String Theory") after having associated with this concept with the second concept ("Particle Physics").

FIG. 12 illustrates an example user interface rendered by the eBook reader device 104(M) when the user 102(M) again selects the first concept ("String Theory") after having associated with this concept with the second concept ("Particle Physics") within the index 118 associated with the device 104(M). As illustrated, this concept may include some visual indication that indicates that the user 102(M) or another user has associated this concept with another concept in an index. While the illustrated example shows the concept "String Theory" in italics, other implementations may bold this text, render this text in a different color, or include any other visual indication. In some instances, the user interface may additionally or alternatively include visual indications for concepts that have most often been associated with other concepts by other users of the user community 102.

Furthermore, in some instances the user 102(M) may select these visually indicated concepts that other users have linked to. In response, the device 104(M) may illustrate a menu (e.g., a pop-up menu) showing other concepts to which other users have linked the visually indicated concept (e.g., the ten most linked-to concepts for the selected concept). This menu may also include location in specific content items at which each user made the link.

In addition or in the alternative, the device 104(M) could display identities of users that have linked the selected concept with another concept. As discussed above, users may obtain (e.g., purchase, subscribe to, download, etc.) indices of other users. Therefore, in one example, the device 104(M) may present a menu that shows the most popular users that have linked to this concept (i.e., the users having respective indices that other users have most frequently downloaded or otherwise obtained). These users may include, in the illustrated example, a popular physics author that has associated a concept with the visually indicated concept, "String Theory." The user 102(M) operating the device 104(M) may operate the menu to obtain the index of, for instance, the popular physics author and/or to determine which concept to which the author linked "String Theory."

Furthermore, in some instances when the user 102(M) selects a concept that has been associated with an additional concept, the device may display information associated with selected concept or the additional concept alone, or information associated with both concepts. Here, the user 102(M) again selects the concept "String Theory" within an eBook 1202 via a touch input 1204. In response to this selection, the device 104(M) may reference the index 118 associated with the device and may determine that this concept has been associated with another concept (in this example, "Particle Physics").

Figure 13:
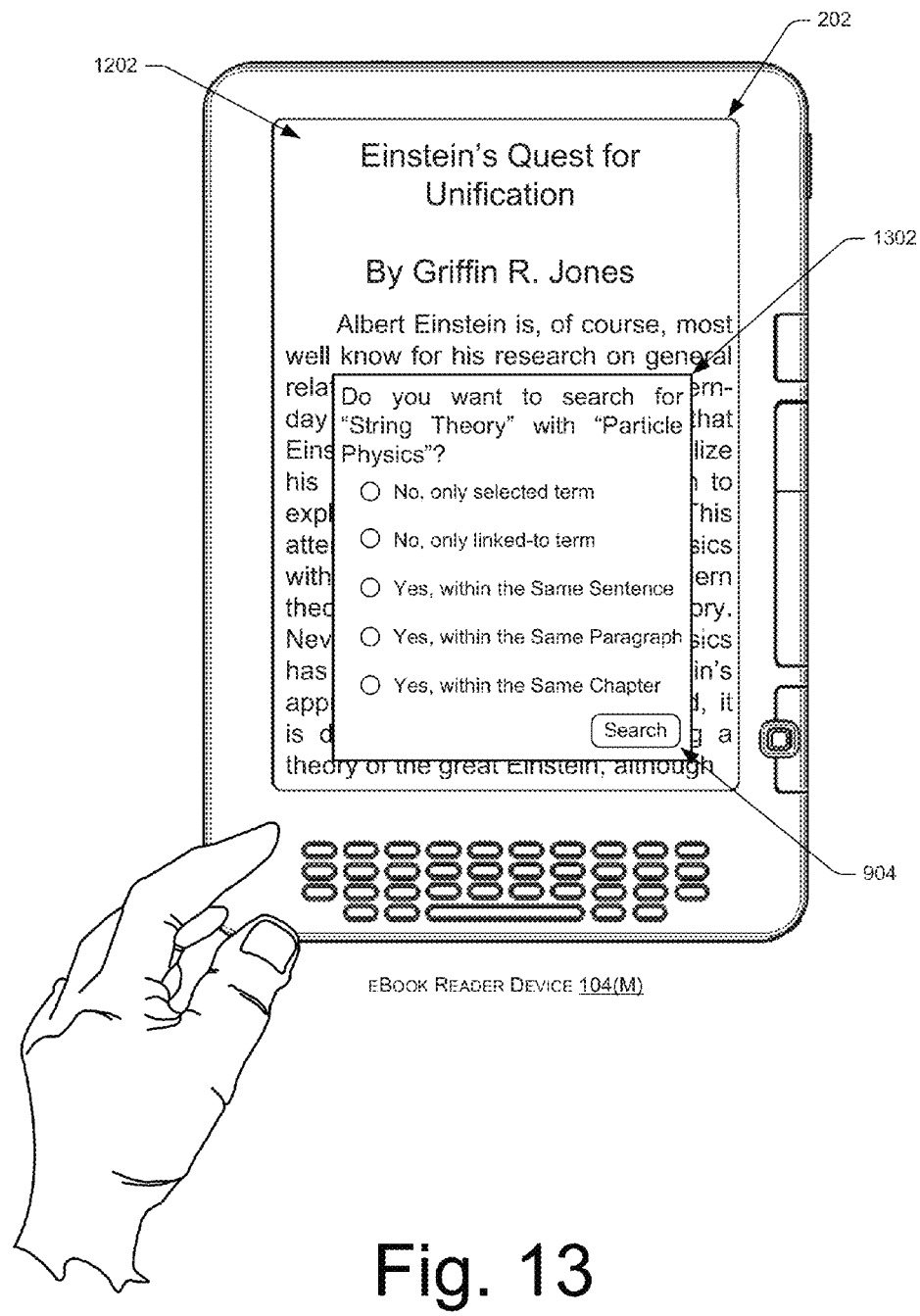
FIG. 13 illustrates an example user interface rendered by the client device after the user has made the selection of FIG. 12. As illustrated, the device allows the user to choose whether to conduct a search for the selected concept alone, or in unison with the second, associated concept.

FIG. 13 illustrates an example user interface rendered by the eBook reader device 104(M) after the selection of FIG. 12. As illustrated, the device 104(M) displays a menu 1302 that allows the user 102(M) to choose whether to conduct a search for the selected concept alone ("String Theory"), the linked-to concept alone ("Particle Physics") or the first concept in unison with the second, associated (or "linked-to") concept. Again, the menu 1302 allows the user to select from several example proximities, although any other proximity may be included in other implementations. In instances where the user selects to view passages that include both "String Theory" and "Particle Physics," the user 102(M) is again able to read or otherwise learn about the interconnection between these two concepts.

Example eBook Reader Device

Figure 14:
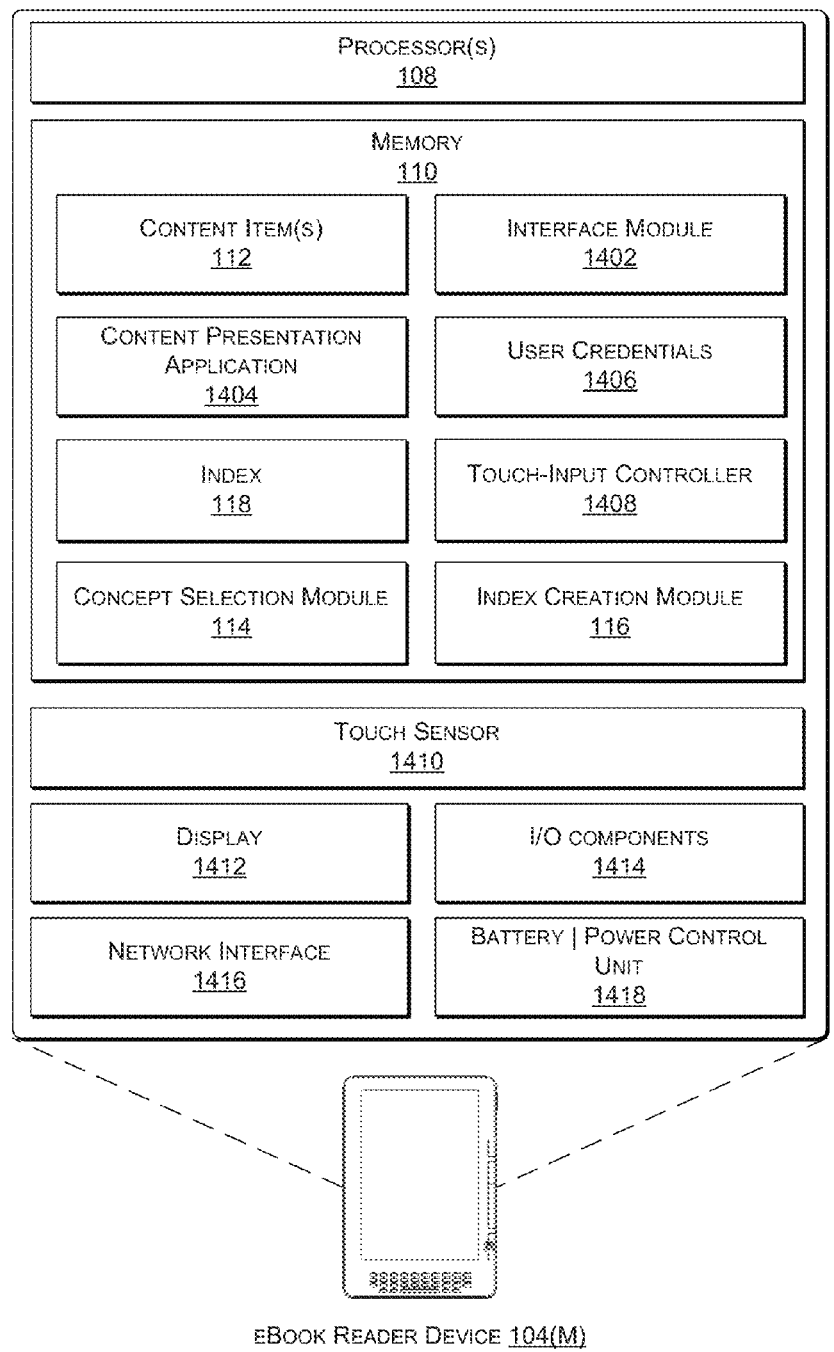
FIG. 14 is a block diagram of selected modules of an electronic device capable of associating selected concepts with one another, such as within an index of the device.

FIG. 14 is a block diagram of selected modules of an example electronic device capable of associating selected concepts with one another, such as within an index of the device. In this example, the example device is a dedicated, handheld eBook reader device 104(M), although other electronic devices may implement these techniques and, hence, may include some of the functionality described herein.

In a very basic configuration, the eBook reader device 104(M) includes one or more processors 108 and memory 110. Depending on the configuration of a dedicated eBook reader device 104(1), the memory 110 (and other memories described throughout this document) is an example of computer storage media and may include volatile and nonvolatile memory. Thus, the memory 110 may include, but is not limited to, RAM, ROM, EEPROM, flash memory, or other memory technology, or any other medium which can be used to store media items or applications and data which can be accessed by the eBook reader device 104(M).

The memory 110 may be used to store any number of functional components that are executable on the processor(s) 108, as well as data and content items that are rendered by the eBook reader device 104(M). Thus, the memory 110 may store an operating system and an eBook storage database to store one or more content items 112, such as eBooks, audio books, songs, videos, still images, and the like. The memory 110 may further include a memory portion designated as an immediate page memory to temporarily store one or more pages of an electronic book. The pages held by the immediate page memory are placed therein a short period before a next page request is expected.

The term "page," as used herein, refers to a collection of content that is presented at one time in a display of the eBook reader device 104(M). Thus, a "page" may be understood as a virtual frame of the content, or a visual display window presenting the content to the user. Thus, "pages" as described herein are not fixed permanently, in contrast to the pages of published "hard" books. Instead, pages described herein may be redefined or repaginated when, for example, the user chooses a different font for displaying the content in the first display. In addition to pages, the terms "page views", "screen views", and the like are also intended to mean a virtual frame of content.

The memory 110 may also include an interface module 1402 that may be executed on the processor(s) 108 to provide for user operation of the device 104(M). One feature of the interface module 1402 allows a user to request to receive information regarding a concept (e.g., one or more words, an image, a location on a map, etc.) found within one of the content items 112. The interface module 1402 may facilitate textual entry of request (e.g., via a cursor, controller, keyboard, etc.), audible entry of the request (e.g., via a microphone), or entry of the request in any other manner. For instance, the interface module 1402 may interface with a touch sensor 1410 that accepts touch inputs. In some instances, the touch input may be integral with a display 1412 of the device to create a touch-sensitive display. The interface module 1402 may further provide menus and other navigational tools to facilitate selection and rendering of the content items 112. The interface module 1402 may further include a browser or other application that facilitates access to sites over a network, such as websites or online merchants.

A content presentation application 1404 renders the content items 112. The content presentation application 1404 may be implemented as various applications depending upon the content items. For instance, the application 1404 may be an electronic book reader application for rending electronic books, or an audio player for playing audio books or songs, or a video player for playing video, and so forth.

The memory 110 may also store user credentials 1406. The credentials 1406 may be device specific (set during manufacturing) or provided as part of a registration process for a service. The credentials may be used to ensure compliance with DRM aspects of rendering the content items 112.

FIG. 2 further illustrates that the memory 110 may store the index 118, the concept selection module 114, and the index creation module 116. As discussed in part above, the concept selection module 114 works in unison with the interface module 1402 to allow the user to select concepts from rendered content items and, in response, display information associated with the selected concept. The index creation module 116, meanwhile, allows the user to link concepts within the index 118, as described above with reference to FIGS. 1-13.

FIG. 2 further illustrates that the eBook reader device 104(M) may include the display 1412, which may be passive, emissive or any other form of display. In one implementation, the display uses electronic paper (ePaper) display technology, which is bi-stable, meaning that it is capable of holding text or other rendered images even when very little or no power is supplied to the display. Some example ePaper-like displays that may be used with the implementations described herein include bi-stable LCDs, MEMS, cholesteric, pigmented electrophoretic, and others. In other implementations, or for other types of devices, the display may be embodied using other technologies, such as LCDs and OLEDs, and may further include a touch screen interface, as described above with reference to FIGS. 2-13.

The eBook reader device 104(M) may further be equipped with various input/output (I/O) components 1414. Such components may include various user interface controls (e.g., buttons, a joystick, a keyboard, etc.), audio speakers, connection ports, and so forth.

A network interface 1416 supports both wired and wireless connection to various networks, such as cellular networks, radio, WiFi networks, short range networks (e.g., Bluetooth), IR, and so forth. The network interface 1416 may allow a user of the device 104(M) to download content items from the content item service 106, for instance.

The eBook reader device 104(M) also includes a battery and power control unit 1418. The battery and power control unit operatively controls an amount of power, or electrical energy, consumed by the eBook reader device. Actively controlling the amount of power consumed by the reader device may achieve more efficient use of electrical energy stored by the battery.

The eBook reader device 104(M) may have additional features or functionality. For example, the eBook reader device 104(M) may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Example Processes

Figure 15:
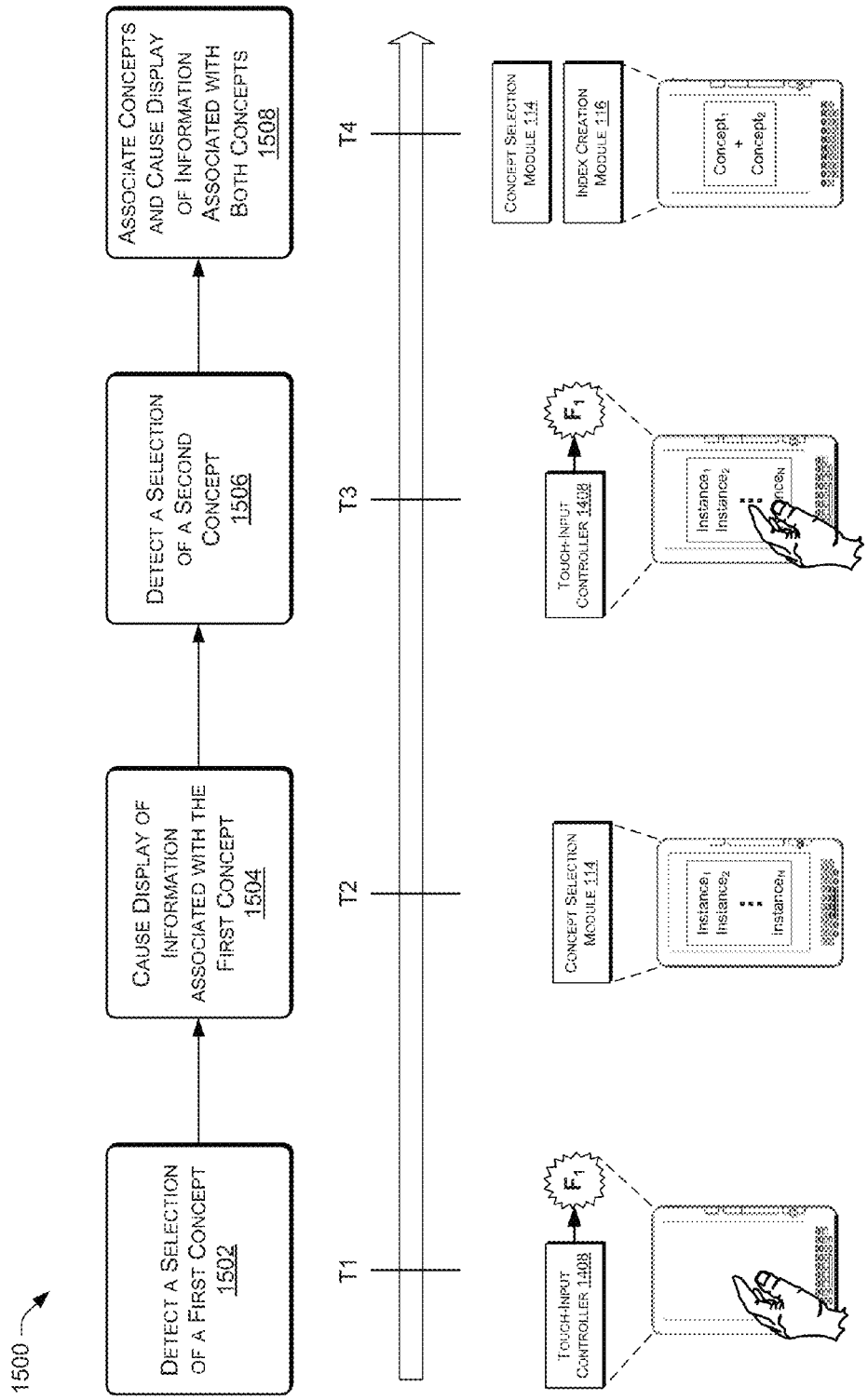
FIG. 15 is a flow diagram showing a process of receiving a selection a first concept, displaying information associated with the first concept, receiving a selection a second concept, and associating the first and second concepts with one another, as well as displaying information associated with these concepts at least partly in response to the selection of the second concept.

FIG. 15 is a flow diagram showing a process 1500 of selecting a first concept, displaying information associated with the first concept, selecting a second concept, and associating the first and second concepts with one another, as well as displaying information associated with these concepts at least partly in response to the selection of the second concept. This process (as well as process 1600 of FIG. 16) is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

For discussion purposes, the processes 1500 and 1600 are described with reference to the architecture 100 of FIG. 1, although other architectures may implement these processes. For instance, while these processes may illustrate and describe the device 104(M) implementing the processes, the content item service 106 or any other entity may implement these processes in other instances.

The process 1500 includes an operation 1502, which represents detecting a selection of a first concept within a content item being rendered on an electronic device. For instance, a user may select a concept "String Theory" on a touch-sensitive display of the device or in any other manner. In response, the device causes display of information associated with the selected first concept at operation 1504. As discussed above, this information may comprise a reference work entry for the concept, other instances of the concept with the rendered content item or other content items, web results for the concept, or any other information.

The device then detects a selection of a second concept at operation 1506. In some instances, this second concept is found within the information associated with the first concept and displayed at least in part at the operation 1504. For instance, the user may have chosen to expand a passage of a content item before selecting the second concept, such as "Particle Physics." Finally, at an operation 1508 the device associates the first and second concepts and causes display of information associated with both concepts at least partly in response to the selection of the second concept.

For instance, the device may prompt the user as to whether the user wishes to associate the concepts as well as whether the user wishes to view information associated with both concepts. If the user affirmatively answers these prompts, then the device may link the concept and display the information associated with both concepts (e.g., passages of content items that include both concepts within a predefined proximity). In other instances, meanwhile, the device may link the concepts and/or cause display of the information associated with both concepts free from prompting the user.

Figure 16:
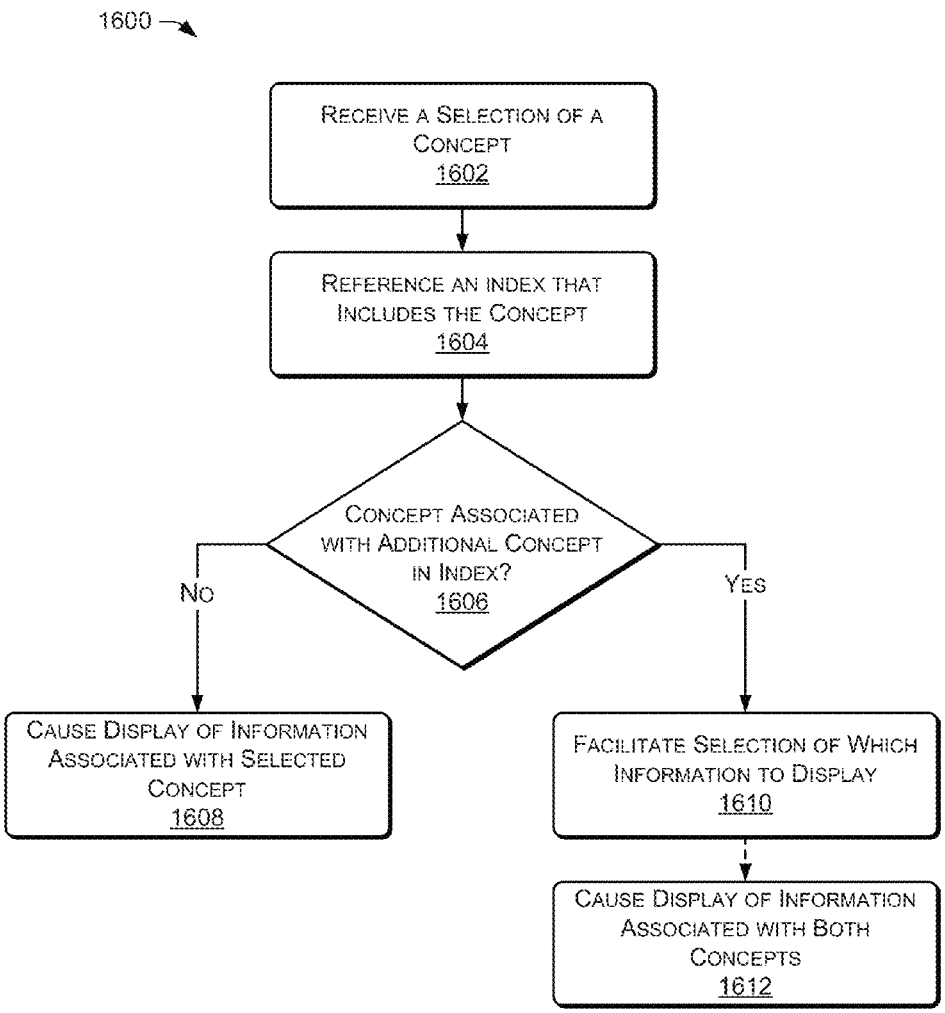
FIG. 16 is a flow diagram showing a process of receiving a selection of a concept from within a content item and determining if this concept has previously been associated, in an index, with another concept. If so, the process allows the user to select whether to display information about the selected concept alone or information associated with both the selected and the additional concepts.

FIG. 16 is a flow diagram showing a process 1600 of receiving a selection of a concept from within a content item and determining if this concept has previously been associated, in an index, with another concept. If so, the process allows the user to select whether to display information about the selected concept alone, information about the additional concept alone, or information associated with both the selected and the additional concepts.

The process 1600 includes, at an operation 1602, receiving a selection of a concept within a content item. Next, an operation 1604 represents referencing an index that includes the concept, possibly along with multiple other concepts. For instance, the index may comprise a relatively small index having a small number of concepts associated with a particular content item, may comprise a large index that includes most topics found within an encyclopedia or other reference work, or may comprise an index of any size there between.

A decision block 1606 represents determining if the concept is associated with one or more other additional concepts within the index. If not, then the process causes display of information associated with the selected concept at an operation 1608. If so, however, then the process 1600 may facilitate selection by a user of a device regarding the information to display in response to the selection at an operation 1610. For instance, the device may prompt the user to determine whether to display information associated solely with the selected concept or the additional concept, or whether to display information associated both the selected concept and one or more additional concepts associated with the selected concept within the index.

The process 1600 may also include, at an operation 1612, causing display of information associated with both concepts, possibly in response to the user selecting to view information associated with both concepts. Conversely, the process 1600 may refrain from facilitating the selection at the operation 1610 and may instead move straight to causing display of the information associated with both concepts at the operation 1612.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. One or more non-transitory computer-readable media storing computer-executable instructions that, when executed, cause one or more processors to perform acts comprising:
   detecting a selection of a first term within an electronic book being rendered by a touch-sensitive display of an electronic book reader device;
   causing display of other instances of the first term within the electronic book or within one or more other electronic books accessible by the electronic book reader device at least partly in response to the detecting of the selection of the first term, the display of the other instances including text surrounding each of the other instances of the first term;
   detecting a selection of a second term on the touch-sensitive display, the second term residing within the text surrounding one of the displayed other instances of the first term; and
   associating the second term with the first term at least partly in response to the detecting of the selection of the second term.

2. One or more non-transitory computer-readable media as recited in claim 1, further storing computer-executable instructions that, when executed, cause the one or more processors to perform acts comprising:
   receiving a selection of one of the other instances of the first term prior to detecting the selection of the second term; and
   at least partly in response, expanding the text surrounding the selected other instance of the first term;
   and wherein the second term is selected from the surrounding text after the expanding.

3. One or more non-transitory computer-readable media as recited in claim 1, further storing computer-executable instructions that, when executed, cause the one or more processors to perform an act comprising displaying one or more portions of the electronic book being rendered by the touch-sensitive display that include both the first and second terms within a specified proximity of one another within the electronic book at least partly in response to the detecting of the selection of the second term.

4. One or more non-transitory computer-readable media as recited in claim 1, further storing computer-executable instructions that, when executed, cause the one or more processors to perform an act comprising displaying one or more portions of the other electronic books accessible by the electronic book reader device that include both the first and second terms within a specified proximity of one another within the respective electronic book at least partly in response to the detecting of the selection of the second term.

5. One or more non-transitory computer-readable media as recited in claim 1, wherein the associating the second term with the first term comprises linking the first and second terms with one another in an index stored on or accessible by the electronic book reader device.

6. One or more non-transitory computer-readable media as recited in claim 1, wherein the causing of the display of the other instances of the first term comprises causing display of a pop-up menu over the electronic book being rendered by the touch-sensitive display of the electronic book reader device.

7. One or more non-transitory computer-readable media as recited in claim 1, further storing computer-executable instructions that, when executed, cause the one or more processors to perform acts comprising:
   after the associating of the second term with the first term, receiving a request to conduct a search using the first term or the second term, individually, as a query for the search; and
   causing display of search results that include both the first and second terms on the touch-sensitive display of the electronic book reader device at least partly in response to the receiving of the request.

8. One or more non-transitory computer-readable media as recited in claim 7, wherein the request comprises a request to search the electronic book being rendered by the touch-sensitive display of the electronic book reader device.

9. One or more non-transitory computer-readable media as recited in claim 7, wherein the request comprises a request to search at least one of the other electronic books accessible by the electronic book reader device.

10. One or more non-transitory computer-readable media as recited in claim 7, wherein the request comprises a request to conduct a web-based search off of the electronic book reader device.

11. One or more non-transitory computer-readable media as recited in claim 1, wherein the selection of the second term is detected while the first term is being selected, and wherein the associating of the first and second terms occurs at least partly in response to detecting the selection of the second term while the first term is selected on the touch-sensitive display.

12. A method comprising:
   under control of one or more computer systems configured with specific executable instructions,
   detecting a selection of a first concept within a content item being output on an electronic device;
   causing display on the electronic device of information associated with the first concept at least partly in response to the detecting of the selection;
   detecting a selection of a second concept from within the information associated with the first concept; and
   at least partly in response to the detecting of the selection of the second concept:
      associating the second concept with the first concept; and
      causing display on the electronic device of one or more portions of the content item or another content item that include the first and second concepts within a specified proximity of one another.

13. A method as recited in claim 12, wherein the first and second concepts comprise, respectively, one or more words, an image, or a video.

14. A method as recited in claim 12, wherein the displayed information associated with the first concept comprises other instances of the first concept within the content item.

15. A method as recited in claim 12, wherein the displayed information associated with the first concept comprises other instances of the first concept within one or more other content items stored on the electronic device.

16. A method as recited in claim 12, wherein the displayed information associated with the first concept comprises an entry for the first concept within a reference work.

17. A method as recited in claim 12, wherein the associating of the second concept within the first concept comprises linking the first and second concepts with one another in an index associated with the electronic device, such that future searches performed on the electronic device for the first concept or the second concept return results that include both the first and second concepts.

18. A method as recited in claim 17, further comprising making available the index associated with the electronic device to other users of other electronic devices.

19. A method as recited in claim 12, further comprising facilitating selection of the specified proximity by a user of the electronic device prior to the causing of the display of the one or more portions of the content item that include the first and second concepts within the specified proximity.

20. A method as recited in claim 12, wherein the content item comprises an electronic book and the electronic device comprises an electronic book reader device, a mobile phone, or a tablet computing device.

21. A method as recited in claim 12, wherein the causing of the display of the information associated with the first concept comprises causing display of the information over the content item being output by the electronic device.

22. A method as recited in claim 12, wherein the selection of the second concept is detected while the first concept is being selected, and wherein the associating of the first and second concepts occurs at least partly in response to detecting the selection of the second concept while the first concept is also being selected.

23. A method as recited in claim 22, wherein the electronic device includes a touch-sensitive display that is configured to detect multiple coincident touches, and the selection of the first concept and the second concept comprise coincident touches on the touch-sensitive display.

24. A method as recited in claim 12, wherein the electronic device includes a touch-sensitive display and the selection of the first concept is received via the touch-sensitive display, and further comprising:
   setting a minimum force threshold or a minimum time threshold associated with causing display of information associated a selected concept; and
   wherein the causing of the display of the information associated with the first concept occurs at least partly in response to determining that the selection of the first concept on the touch-sensitive display exceeds the minimum force threshold or the minimum time threshold.

25. A method as recited in claim 12, further comprising:
after the associating of the second concept with the first concept, receiving a selection of the first concept within the content item or another content item being output by the electronic device; and
facilitating selection, by the user, of whether to display information associated with the first concept alone, the second concept alone, or both the first and second concepts.

26. An electronic device comprising:
one or more processors; and
one or more computer-readable media storing computer-executable instructions that, when executed, cause the one or more processors to perform a method as recited in claim 12.

27. A method comprising:
under control of an electronic device having a touch-sensitive display and configured with specific executable instructions,
receiving, from a user of the electronic device and on the touch-sensitive display, a selection of a concept within a content item being rendered on the touch-sensitive display;
at least partly in response to the receiving of the selection, referencing an index stored on or accessible by the electronic device to determine whether the user or another user has previously associated the selected concept with an additional concept;
at least partly in response to determining that the user has not previously associated the selected concept with an additional concept in the index, causing display on the electronic device of information associated with the selected concept; and
at least partly in response to determining that the user has previously associated the selected concept with an additional concept in the index:
    causing display on the electronic device of information associated with both the selected concept and the additional concept; or
    facilitating selection, by the user, of whether to display on the electronic device information associated with the selected concept alone, the additional concept alone, or both the selected concept and the additional concept.

28. A method as recited in claim 27, wherein the information associated with the selected concept comprises other instances of the selected concept within the content item being rendered on the touch-sensitive display of the electronic device or other instances of the selected concept within other content items accessible by the electronic device.

29. A method as recited in claim 27, wherein the information associated with both the selected concept and the additional concept comprises:
one or more passages of the content item rendered on the touch-sensitive display of the electronic device that include both the selected concept and the additional concept within a specified distance of one another; or
one or more passages of other content items accessible by the electronic device that include both the selected concept and the additional concept within the specified distance of one another.

30. A method as recited in claim 29, wherein the specified distance is selectable by the user of the electronic device.

31. An electronic device comprising:
one or more processors; and
one or more computer-readable media storing computer-executable instructions that, when executed, cause the one or more processors to perform a method as recited in claim 27.

* * * * *